No. 808,757. PATENTED JAN. 2, 1906.
J. A. JONES.
GATE HINGE.
APPLICATION FILED JUNE 17, 1904.
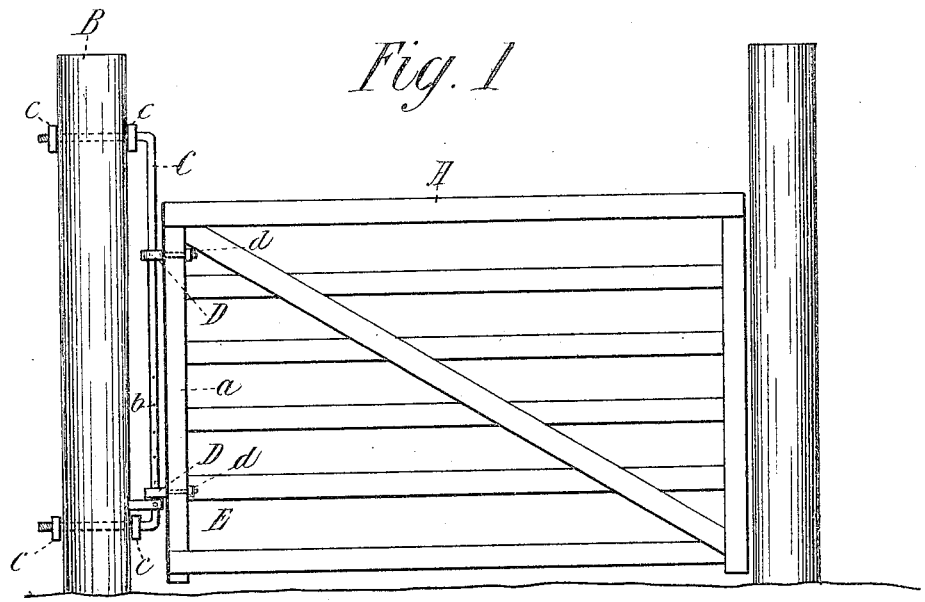
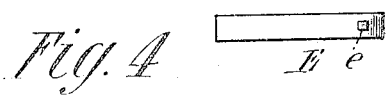
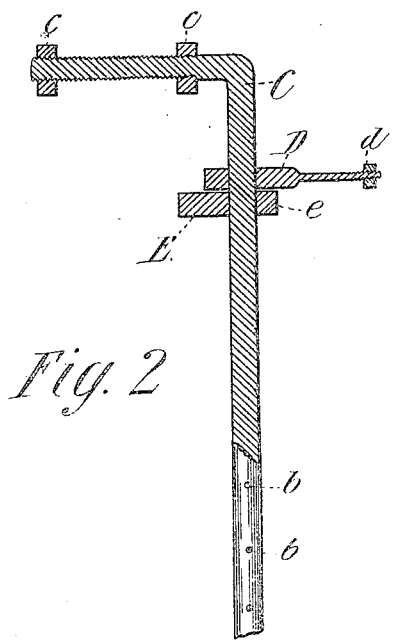

UNITED STATES PATENT OFFICE.

JOHN A. JONES, OF MITCHELL, MONTANA.

GATE-HINGE.

No. 808,757.  Specification of Letters Patent.  Patented Jan. 2, 1906.

Application filed June 17, 1904. Serial No. 212,984.

*To all whom it may concern:*

Be it known that I, JOHN A. JONES, a citizen of the United States, residing at Mitchell, in the county of Lewis and Clarke and State of Montana, have invented certain new and useful Improvements in Gate-Hinges, of which the following is a specification, reference being had therein to the accompanying drawings.

While many gate-hinges have been invented of varying designs and to cover special purposes, my invention is intended to supply a gate-hinge simple in construction, strong and durable, adjustable to any gate-post, and vertically adjustable to clear obstacles.

Similar letters indicate similar parts in all the drawings.

Figure I shows the hinge supporting the gate in place. Fig. II shows part of the hinge in section. Fig. III shows a plan of the guide-piece. Fig. IV shows an elevation of the guide-piece.

The gate A has the usual standard $a$ of suitable material and proportions to receive the bolts $d\ d$. The post B is also of proper proportions and is deeply set in the ground, so as to firmly support the gate A. The rod C, having its ends bent at right angles and threaded, is firmly secured to the post B by the nuts $c\ c$. The hinge-bolts D D are provided with an eye and slide freely on the rod C and are threaded at their free end, so as to be securely attached to the gate-standard $a$ by the nuts $d\ d$. The guide-piece and brace E is placed on the rod C below the lower hinge-bolt D. It has an eye to fit about the rod C and a set-screw $e$ by which it can be set at any point on the rod C by means of the shallow holes $b\ b$ in that rod. Its free end is fashioned slightly concave, so as to fit firmly against the post B, thus securely bracing the gate A and reinforcing the rod C.

The mode of operation is readily seen. The rod C, upon which the hinge-bolts D D and the brace-piece E have been previously placed, is fastened to the post B at any desired elevation by its threaded ends and the nuts $c\ c$. The gate is then placed in position and secured to the rod by the hinge-bolts D D and their nuts $d\ d$. The proper elevation of the gate is then maintained by placing the brace-piece E against the lower hinge-bolt D and securing it in its position by the set-screw $e$, inserted in one of the holes $b$ in the rod C. The free end of the brace-piece E is placed against the post B. Ordinarily the gate will be hung so as to just clear the ground easily. Should the ground become obstructed with snow or otherwise or the post B give, so as to permit the gate to touch or drag, it is easily and quickly adjusted by raising the gate, the hinge-bolts sliding on the rod C and after securing the desired elevation holding it in its raised position by the brace-piece E and its set-screw $e$. It can be as easily lowered again when the obstruction is removed.

The simple construction of this hinge allows of the gate being swung either way and well back. Its method of attachment to the post and to the gate-standard allows of its ready adjustment to any sized gate or post and to be quickly readjusted to a new post or gate. In view of these features it will be seen that it is simple, strong, durable, and easily adjustable to all the ordinary conditions affecting gates.

Having thus described my invention, what I claim as new, and desire to secure by Letters Patent, is—

A gate-hinge consisting of a continuous pintle directly attachable to a post and hinge-eyebolts, rotatively mounted on the pintle and attachable to a gate, in combination with a guide and brace piece, having a collar closely fitting upon the pintle below the lower hinge-bolt, and vertically adjustable thereon by means of a set-screw, and of such length as to have the free end in contact with the post.

In testimony whereof I affix my signature in presence of two witnesses.

JOHN A. JONES.

Witnesses:
 HENRY CANNON,
 EDWARD C. RUSSEL.